INVENTOR.
CHARLES M. WINE
BY
ATTORNEY 3,119,030
TRANSMISSION LINE GATING MEANS FOR PREVENTING SPURIOUS PULSES FROM FEEDING BACK FROM OUTPUT TO INPUT
Charles M. Wine, Princeton, N.J., assignor to Radio Corporation of America, a corporation of Delaware
Filed Nov. 22, 1961, Ser. No. 154,194
9 Claims. (Cl. 307—88.5)

This invention relates generally to apparatus for eliminating unwanted, spurious pulses. More particularly, this invention relates to improved apparatus for preventing the spurious pulses that usually occur at the input of a sampling oscilloscope, during the sampling periods, from reaching and interfering with the source of signals to be sampled. This invention also relates to a novel balanced transmission gate which may be used as a component in the aforementioned apparatus.

The usefulness of many sampling oscilloscopes has been limited because of the occurrence of spurious pulses, hereinafter called kickback pulses, every time an incoming signal is sampled. When the sampling oscilloscope samples an incoming signal, part of the sampling pulse appears at the input terminal and tends to interfere with the signal source, that is, the circuit under investigation. This is particularly serious when the circuit being observed is a sensitive, threshold circuit with information storage properties. The effects of the kickback pulses may manifest themselves, for example, by an interference with the operation of the signal source. Depending upon the circuitry of the sampling oscilloscope, the kickback pulse may be a positive or a negative pulse of as much as two volts in amplitude.

It has been proposed to use balanced sampling circuits in sampling oscilloscopes to reduce the amplitude of the kickback pulses, but such circuitry usually results in a loss of freedom in the design of the sampling head and a consequent loss of the displayed signal bandwidth.

An object of the present invention is to provide improved apparatus for permitting signals from a signal source to travel in one direction to a piece of apparatus, and for preventing spurious pulses from the apparatus from traveling back to the signal source.

It is another object of the present invention to provide improved apparatus for eliminating the effects of kickback pulses that usually occur at the input of a sampling oscilloscope when signals are sampled.

Still another object of the present invention is to provide an improved, novel, balanced, transmission gate that permits signals to pass through it when open, and reflects and dissipates pulses attempting to travel it in any direction, when closed.

A further object of the present invention is to provide improved apparatus of the type described that is relatively simple in structure, very reliable in operation, and highly efficient in use.

Briefly, the improved apparatus of the present invention comprises a novel balanced transmission gate as one of its components. Signals from a source of signals under observation are attenuated, if necessary, to the level acceptable by a sampling oscilloscope. The attenuated signals are applied to the balanced transmission gate which is normally open, and the signals pass through it without distortion or any further attenuation. The signals are then applied to the input of the sampling oscilloscope through a delay line. At the moment of sampling, a kickback pulse is developed which starts to travel through the delay line and toward the signal source. A portion of the kickback pulse is caused to generate at least one gate pulse. The gate pulse is applied to the balanced transmission gate to close it so that the kickback pulse will be reflected when it arrives at the balanced transmission gate via the delay line, thus dissipating the kickback pulse.

The novel balanced transmission gate of the present invention comprises, for example, a two-conductor transmission line having each of a pair of switching devices, such as diodes, connected respectively in parallel circuits, between a point on one conductor and a point on the other conductor. The diodes are oppositely poled, and means are connected to them for applying a reverse bias to them to maintain them in a non-conductive state. In this condition, the balanced transmission gate is open. The transmission line is compensated, at the points where the diodes are connected, for the capacitance introduced by the non-conducting diodes in order to maintain a desired characteristic impedance throughout the transmission line. Means are also connected to the diodes to overcome the reverse bias and to cause them to conduct when it is desired to close the balanced transmission gate. The conductors of the transmission line are effectively shorted when the diodes are caused to conduct, and any signals or pulses reaching the gate, from either direction, are reflected and dissipated.

The novel features of the present invention, both as to its organization and operation, as well as additional objects and advantages thereof, will be more readily understood from the following description, when read in connection with the accompanying drawings, in which similar reference characters refer to similar parts throughout, and in which.

Figure 1:
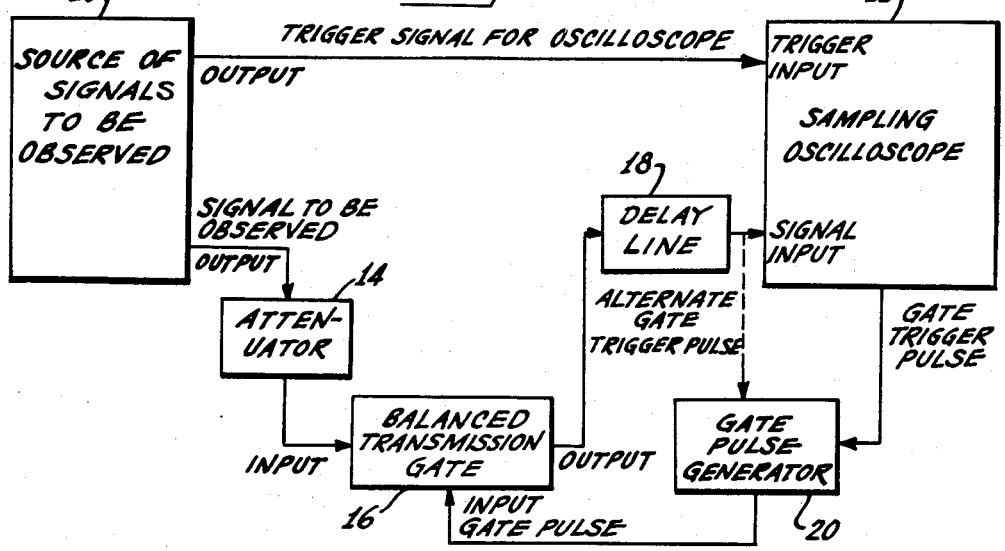
FIG. 1 is a schematic diagram, in block form, of improved apparatus, in accordance with the present invention, for eliminating the effects of kickback pulses when signals are sampled by a sampling oscilloscope.

Referring, now, to FIG. 1, there is shown an improved arrangement of apparatus for sampling signals from a source 10 of signals to be observed by a sampling oscilloscope 12. Trigger signals for triggering the horizontal deflection circuits of the oscilloscope 12 may be obtained from an output of the signal source 10 and applied to the trigger input of the sampling oscilloscope 12, as shown in FIG. 1.

The signal source 10 may be any circuit or system that produces repetitive signals whose bandwidth is usually too great to permit them to be observed on a conventional oscilloscope. The novel arrangement of apparatus between the signal source 10 and the sampling oscilloscope 12 enables one to sample the signals to be observed and to prevent kickback pulses from traveling from the sampling oscilloscope 12 to the signal source 10, thereby preventing interference with the operation of the signal source 10.

The signals to be observed from the source 10 are applied to the input of the sampling oscilloscope 12 through an attenuator 14, a balanced transmission gate 16, and a delay line 18, in the order named. The attenuator 14 attenuates the signals to the desired amplitude (typically, 50 millivolts) that is acceptable by the sampling oscilloscope 12. The attenuated signals then pass through the balanced transmission gate 16 and the delay line 18 without distortion or any further attenuation.

At the moment of sampling a signal, the sampling oscilloscope 12 produces a kickback pulse at its input. This kickback pulse, or a portion of it, may be applied, as a triggering pulse, either directly to a gate pulse generator 20 of known design, or indirectly to the gate pulse generator 20 through the circuitry of the sampling oscilloscope 12 that is responsive to the kickback pulse. The output of the pulse generator 20 is applied to the gate pulse input of the balanced transmission gate 16 to close the normally open balanced transmission gate 16. In operation, the balanced transmission gate 16 permits properly attenuated signals to pass through and to be applied to the sampling oscilloscope 12, but reflects kickback pulses traveling from the sampling oscilloscope 12 toward the signal source 10.

Figure 2:
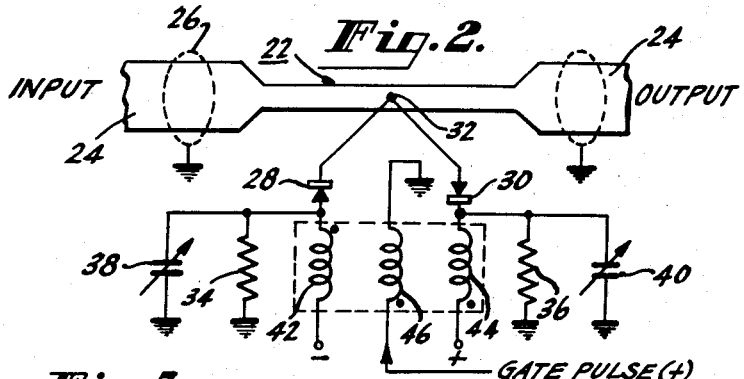
FIG. 2 is a schematic diagram of one embodiment of a novel, balanced, transmission gate of the type shown in block form in FIG. 1.

Referring, now, to FIG. 2, there is shown one form of a novel, balanced, transmission gate 22 of the type useful as the gate 16 in FIG. 1. The gate 22 comprises a transmission line, such as a coaxial transmission line, having a central conductor 24 and a usually grounded outer conductor 26, as shown schematically. A pair of switching devices, such as diodes 28 and 30, are respectively connected in the respective branches of a parallel circuit between a point 32 on the central conductor 24 and the outer conductor 26. The cathode of the diode 28 and the anode of the diode 30 are connected directly to the point 32, and the anode of the diode 28 and the cathode of the diode 30 are connected to the outer conductor 26 through resistors 34 and 36, respectively. Trimmer capacitors 38 and 40 are shunted across the resistors 34 and 36, respectively, for the purpose hereinafter appearing.

The anode of the diode 28 is connected to a source of negative voltage through an inductor 42, as indicated, to reverse bias the diode 28. The cathode of the diode 30 is connected to a source of positive voltage, as indicated, through an inductor 44 to reverse bias the diode 30. An inductor 46, inductively coupled to the inductors 42 and 44, has one end connected to the outer conductor 26 and the other end connected to a source of gate pulses, as indicated, for actuating (closing) the balanced transmission gate 22.

The transmission line comprising the conductors 24 and 26 has a characteristic impedance of desired value throughout its length. Since the reverse biased diodes 28 and 30 function as small capacitors when not conducting, they tend to increase the capacitance of the transmission line at the point where they are connected. In order to compensate for this additional capacitance, the inductance of the transmission line is increased by altering its physical structure. Thus, for example, by narrowing a portion of the central conductor 24 adjacent to the point 32 to which the diodes 28 and 30 are connected, as shown in FIG. 2, the inductance of the transmission line is increased, and the characteristic impedance of the transmission line is maintained uniform. The trimmer capacitors 38 and 40 are tuned to compensate for differences between the inductors 42 and 44. The capacitors 38 and 40 also function as low impedance paths to ground for rapidly varying pulses.

In operation, signals from the signal source 10 pass through the normally open, balanced, transmission gate 22 without attenuation and distortion. The balanced transmission gate is open when the diodes 28 and 30 are reverse biased, so that no current flows through them. In order to close the balanced transmission gate 22, a positive-going gate pulse is applied to the inductor 46. This positive-going gate pulse is induced into the inductors 42 and 44 with polarities to overcome the reverse bias on the diodes 28 and 30 and to cause the diodes to conduct. In their conductive states, the diodes 28 and 30 provide substantially a short circuit between the central and outer conductors 24 and 26 and cause any pulses that attempt to pass through the balanced transmission gate 22, in any direction, to be reflected and dissipated. It is noted that the balanced transmission gate 22 requires only one gate pulse to close it.

Figure 3:
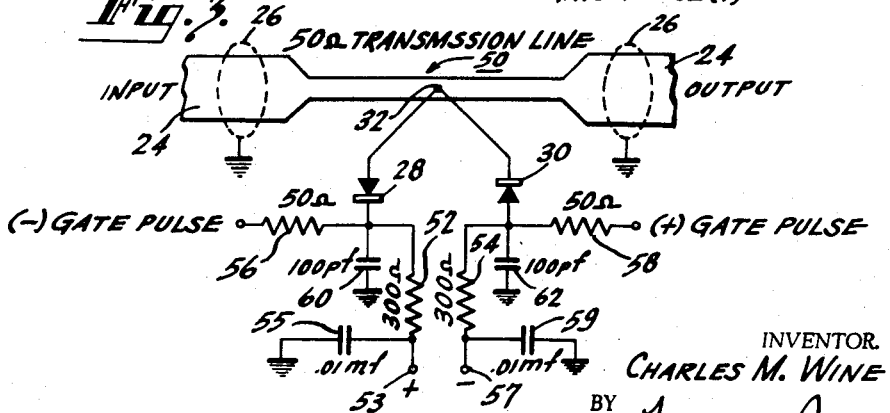
FIG. 3 is a schematic diagram of another embodiment of the novel balanced transmission gate of the type shown in block form in FIG. 1.

Referring, now, to FIG. 3, there is shown another embodiment of a balanced transmission gate 50, wherein the normally open transmission gate may be closed by means of two gate pulses of opposite polarity. In the balanced transmission gate 50, the cathode 28 is reverse biased by a source of positive voltage, as shown, through a resistor 52 and an input terminal 53. The terminal 53 is connected to the outer conductor 26 through a by-pass capacitor 55. The anode of the diode 30 is reverse biased by a source of negative voltage, as shown, through a resistor 54 and an input terminal 57. The input terminal 57 is connected to the outer conductor 26 through a by-pass capacitor 59. A source of negative gate pulses can be applied to the cathode of the diode 28 through a resistor 56, and a source of positive gate pulses can be applied to the anode of the diode 30 through a resistor 58. The cathode of the diode 28 and the anode of the diode 30 are connected to the central conductor 26 through small capacitors 60 and 62, respectively.

When the diodes 28 and 30 are reverse biased, the balanced transmission gate 50 is open, and signals can pass through it substantially without attenuation or distortion. The characteristic impedance of the transmission line comprising the central and the outer conductors 24 and 26 is maintained substantially uniform throughout by compensating for the capacitance of the non-conducting diodes 28 and 30 in substantially the same manner as described for the balanced transmission gate 22 of FIG. 2. Thus, the inductance of the conductor 24 is increased by narrowing the portion adjacent to the point 32. In order to close the balanced transmission gate 50, positive and negative pulses are applied simultaneously to the anode and to the cathode of the diodes 30 and 28, respectively, to cause the diodes to conduct. When conducting, the conductors 24 and 26 are substantially shorted through these conducting diodes. In the latter, closed condition, any signals entering the balanced transmission gate 50, from either direction, will be reflected and eventually dissipated.

The operation of the improved apparatus, illustrated in FIG. 1, for preventing kickback pulses from the sampling oscilloscope 12 from reaching the signal source 10 will now be explained: Signals from the signal source 10 are applied to the signal input of the sampling oscilloscope 12 through the attenuator 14, the balanced transmission gate 16, and the delay line 18. The balanced transmission gate 16 is normally open. The gate 16 may be either one of the gates 22 or 50 of FIGS. 2 and 3. At the moment of each sampling, a kickback pulse, either from the signal input of the sampling oscilloscope 12 or from any other suitable point in the sampling oscilloscope circuit, is applied to the gate pulse generator to trigger it. The output of the triggered gate pulse generator 20 may be either a single pulse or concurrent positive-going and negative-going pulses, as from a known gate pulse generator of the flip-flop type. The time duration of the gate pulses may be of any desired length, as available from known, adjustable gate pulse generators. The gate pulse or pulses, as the case may be, are applied to the balanced transmission gate 16 to close it before the kickback pulse arrives there, the kickback pulse having to travel through the delay line 18 from the signal input of the sampling oscilloscope 12 to the balanced transmission gate 16. Thus, if the balanced transmission gate 16 is closed when the kickback pulse arrives, the kickback pulse will be reflected and eventually dissipated, and it will be prevented from reaching the signal source 10. Hence, the kickback pulse is prevented from interfering with the signal source 10.

From the foregoing description, it will be apparent that there has been provided improved apparatus for preventing spurious pulses that occur at the input of a sampling oscilloscope, during the sampling periods, from reaching and interfering with the source of signals to be sampled. There has also been provided a novel balanced transmission gate. While the apparatus has been shown in diagrammatic form, various components useful therein, as well as variations in the system itself, coming within the spirit of the invention, will, no doubt, readily suggest

What is claimed is:

1. In a system of the type wherein signals from a first circuit are applied to the input of a second circuit, and wherein pulses are generated at said second circuit which tend to travel to said first circuit, the improvement comprising apparatus for preventing said pulses from traveling to said first circuit, said apparatus comprising, in combination,
   (a) a normally open, balanced transmission gate,
   (b) a delay line,
   (c) means applying said signals from said first circuit to said input of said second circuit through said gate and said delay line, in the order named, and
   (d) means connected between said second circuit and said gate and responsive to said pulses to close said gate before each of said pulses reaches said gate through said delay line, whereby to dissipate said pulses.

2. In a system of the type wherein signals from a first circuit are applied to the input of a second circuit, and wherein pulses are generated at said second circuit which tend to travel to said first circuit, the improvement comprising apparatus for preventing said pulses from traveling to said first circuit, said apparatus comprising, in combination,
   (a) a balanced transmission gate,
   (b) a delay line,
   (c) means to apply said signals from said first circuit to said input of said second circuit through said gate and said delay line, in the order named,
   (d) a gate pulse generator, and
   (e) means connecting said gate pulse generator between said second circuit and said gate to close said gate before each of said pulses reaches said gate through said delay line, whereby to dissipate said pulses.

3. Apparatus for preventing kickback pulses occurring at the input of a sampling oscilloscope from traveling to a source of signals to be sampled by said sampling oscilloscope every time one of said signals is sampled, said apparatus comprising, in combination,
   (a) a normally open, balanced transmission gate,
   (b) a delay line,
   (c) means applying said signals from said source to said input of said sampling oscilloscope through said gate and said delay line, in the order named, whereby to obtain a separate one of said kickback pulses for each of said signals sampled, and
   (d) means connected between said sampling oscilloscope and said gate and responsive to each of said kickback pulses to close said gate before each of said kickback pulses reaches said gate through said delay line, whereby to dissipate said kickback pulses.

4. Apparatus for preventing kickback pulses occurring at the input of a sampling oscilloscope from traveling to a source of signals to be sampled by said sampling oscilloscope when said signals are sampled, said apparatus comprising, in combination,
   (a) an attenuator,
   (b) a balanced transmission gate,
   (c) a delay line,
   (d) means to apply said signals from said source to said input of said sampling oscilloscope through said attenuator, said gate, and said delay line, in the order named, whereby to obtain said kickback pulses periodically,
   (e) a pulse generator, and
   (f) means connecting said pulse generator between said sampling oscilloscope and said gate to close said gate before each of said kickback pulses reaches said gate through said delay line, whereby to dissipate said kickback pulses.

5. A balanced transmission gate comprising
   (a) a transmission line having two conductors spaced from each other, one of said conductors comprising a common connection,
   (b) a pair of diodes,
   (c) means connecting said diodes poled in opposite directions between a point on the other of said conductors and said one conductor,
   (d) means connected to said diodes for applying a reverse bias to each of said diodes, and
   (e) means coupled to each of said diodes to cause them to conduct and to close said gate when a voltage is applied to said diodes to overcome said reverse bias, whereby to decrease the impedance between said conductors.

6. A balanced transmission gate comprising
   (a) two conductors spaced from each other, one of said conductors comprising a common connection,
   (b) a pair of diodes,
   (c) means connecting said diodes in parallel circuits and poled in opposite directions between a point on the other of said conductors and said one conductor,
   (d) means connected to said diodes for applying a reverse bias to each of said diodes, and
   (e) means coupled to each of said diodes to cause them to conduct and to close said gate when a voltage is applied to said diodes to overcome said reverse bias, whereby to decrease the impedance between said conductors,
   (f) said two conductors comprising a transmission line having a uniform characteristic impedance throughout, and said other conductor being narrowed adjacent to said point to compensate for the change in impedance provided by said diodes when said diodes are not conducting.

7. A balanced transmission gate comprising
   (a) a transmission line having a uniform characteristic impedance throughout and two conductors spaced from each other, one of said conductors comprising a common connection,
   (b) a pair of diodes,
   (c) means connecting said diodes in parallel circuits and poled in opposite directions between a point on the other of said conductors and said one conductor,
   (d) means connected to said diodes for applying a reverse bias to each of said diodes,
   (e) first and second windings connected in series with each of said pair of diodes, respectively, and
   (f) a third winding inductively coupled to said first and said second windings,
   (g) said third winding having one end connected to said one conductor and the other end for applying a pulse thereto to overcome said reverse bias and to cause said diodes to conduct, whereby to decrease the impedance between said conductors and to close said gate.

8. A balanced transmission gate comprising
   (a) a transmission line having a uniform characteristic impedance throughout and having two conductors spaced from each other, one of said conductors comprising a common connection,
   (b) a pair of diodes,
   (c) means connecting said diodes poled in opposite directions between a point on the other of said conductors and said one conductor,
   (d) means connected to the cathode of one of said diodes and to the anode of the other of said diodes for applying a reverse bias to each of said diodes, and
   (e) means connected to said cathode and to said anode of said diodes for applying pulses of opposite polarity thereto, respectively, to overcome said reverse bias and to cause said diodes to conduct, whereby to decrease the impedance between said conductors and to close said gate.

9. A balanced transmission gate comprising
   (a) two conductors spaced from each other, one of said conductors comprising a common connection,
   (b) a pair of diodes,
   (c) means connecting said diodes in parallel circuits and poled in opposite directions between a point on the other of said conductors and said one conductor,
   (d) means connected to said diodes for applying a reverse bias to each of said diodes, and
   (e) means coupled to each of said diodes to cause them to conduct and to close said gate when a voltage is applied to said diodes to overcome said reverse bias, whereby to decrease the impedance between said conductors,
   (f) said two conductors comprising a transmission line having a uniform characteristic impedance throughout, and
   (g) at least one of said conductors having altered dimensions adjacent to said point to compensate for the capacitance provided by said diodes when said diodes are not conducting.

No references cited.